US010652373B2

(12) United States Patent
Cha et al.

(10) Patent No.: US 10,652,373 B2
(45) Date of Patent: May 12, 2020

(54) MOBILE TERMINAL

(71) Applicant: LG ELECTRONICS INC., Seoul (KR)

(72) Inventors: Youngdo Cha, Seoul (KR); Choonhwa Lee, Seoul (KR); Bonghyun Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/347,409

(22) PCT Filed: Nov. 22, 2016

(86) PCT No.: PCT/KR2016/013477
§ 371 (c)(1),
(2) Date: May 3, 2019

(87) PCT Pub. No.: WO2018/097340
PCT Pub. Date: May 31, 2018

(65) Prior Publication Data
US 2019/0312961 A1 Oct. 10, 2019

(51) Int. Cl.
H04M 1/02 (2006.01)
G06F 1/20 (2006.01)
H04M 1/18 (2006.01)

(52) U.S. Cl.
CPC .......... *H04M 1/0249* (2013.01); *G06F 1/203* (2013.01); *H04M 1/02* (2013.01); *H04M 1/0264* (2013.01); *H04M 1/18* (2013.01)

(58) Field of Classification Search
CPC ...... G06F 1/1626; G06F 1/1686; G06F 1/203; H04M 1/02; H04M 1/0249; H04M 1/0264; H04M 1/0283; H04M 1/18
(Continued)

(56) References Cited

U.S. PATENT DOCUMENTS 8,509,864 B1* 8/2013 Diebel ................... G03B 17/02
455/575.8
9,232,036 B2* 1/2016 Mase ....................... H04M 1/04
(Continued)

FOREIGN PATENT DOCUMENTS

JP 2014-93611 A 5/2014
KR 10-2013-0025769 B1 3/2013
(Continued)

*Primary Examiner* — Tan H Trinh
(74) *Attorney, Agent, or Firm* — Birch, Stewart, Kolasch & Birch, LLP

(57) ABSTRACT

The durability of a mobile terminal can be improved by improving the heat-dissipating performance thereof, the mobile terminal comprising an inner space and having a camera hole formed on the rear surface thereof; a substrate located in the inner space and having an electric element mounted thereon; a camera module including a lens part and mounted at a location corresponding to the camera hole; a deco frame, which includes a lens hole for exposing a lens part of the camera module and a heat-dissipating hole formed on the circumference of the lens hole, and is inserted into the camera hole; and a heat-dissipating sheet located in the inner space and including a heat-absorbing part coming in contact with the electric element, a heat-dissipating part located on the inner side of the deco frame and covering the heat-dissipating hole, and a heat transfer part connecting the heat absorbing part and the heat-dissipating part.

9 Claims, 6 Drawing Sheets

(58) Field of Classification Search
USPC ...... 455/566, 575.1, 575.8; 361/748, 679.26, 361/809
See application file for complete search history.

(56) References Cited

U.S. PATENT DOCUMENTS

| | | | | |
|---|---|---|---|---|
| 2009/0009477 | A1* | 1/2009 | Yukawa | G06F 1/1601 345/168 |
| 2011/0287812 | A1* | 11/2011 | Joo | H04M 1/185 455/566 |
| 2012/0051050 | A1* | 3/2012 | Lee | F21S 2/005 362/235 |
| 2013/0027892 | A1* | 1/2013 | Lim | H04M 1/185 361/748 |
| 2013/0250504 | A1* | 9/2013 | Choi | G06F 1/203 361/679.26 |
| 2014/0268623 | A1* | 9/2014 | Kim | H04M 1/0249 361/809 |
| 2016/0281974 | A1* | 9/2016 | Song | F21V 25/12 |
| 2017/0006738 | A1* | 1/2017 | Lee | G06F 1/203 |
| 2018/0007181 | A1* | 1/2018 | Lee | H05K 5/04 |
| 2018/0054553 | A1* | 2/2018 | Choi | H04N 5/247 |
| 2018/0261907 | A1* | 9/2018 | Ha | H01Q 1/24 |

FOREIGN PATENT DOCUMENTS

| | | |
|---|---|---|
| KR | 10-2015-0066832 A | 6/2015 |
| KR | 10-1609642 B1 | 4/2016 |
| KR | 10-2016-0125804 A | 11/2016 |

* cited by examiner (a)

(b)

(a)

(b)

MOBILE TERMINAL

CROSS REFERENCE TO RELATED APPLICATIONS

This application is the National Phase of PCT/KR2016/013477 filed on Nov. 22, 2016, which is hereby expressly incorporated by reference into the present application.

FIELD

Embodiments of the present disclosure relate to a mobile terminal that has an improved heat radiation function.

BACKGROUND

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

As such functions become more diversified and complicated, people spend more time on mobile terminals and an application processor (AP) provided in such the mobile terminal has to process more information. To enhance the usability and durability of the mobile terminal, there are more increasing needs for a new heat radiation structure configured to radiate the heat generated in the application processor.

DETAILED DESCRIPTION OF THE INVENTION

Technical Problem

To overcome the disadvantages, an object of the present invention is to address the above-noted and other problems and provide a mobile terminal having an improved heat radiation function.

Technical Solution

To achieve these objects and other advantages and in accordance with the purpose of the embodiments, as embodied and broadly described herein, a mobile terminal comprises a body comprising a metal frame, a rear case, a space defined between the metal frame and the rear case, and a camera hole formed in the rear case; a camera module comprising a lens unit arranged in the space and configured to receive light via the camera hole and an image sensor configured to acquire an image from the light incident on the lens unit; a substrate arranged in the space and comprising an application processor; a battery loaded in the space and configured to supply an electric power to the application processor; a deco-frame comprising a lens hole and a heat radiation hole formed in a circumference of the lens hole and arranged in the camera hole; and a heat radiation sheet comprising a heat absorption portion in contact with the application processor, a heat radiation portion provided to cover the deco-frame and a heat transfer portion disposed between the heat absorption portion and the heat radiation portion, wherein the heat radiation portion is exposed to the outside via the heat radiation hole.

The mobile terminal may further comprise a first waterproof member arranged between the deco-frame and the rear case and comprising a hole corresponding to the camera hole; and a second waterproof member arranged between the deco-frame and the heat radiation portion of the heat radiation sheet and comprising a first hole corresponding to the heat radiation hole.

The first waterproof member may be located in an outer area of the heat radiation hole.

A plurality of heat radiation holes may be provided and the second waterproof member may comprise a plurality of ring-shaped waterproof members arranged around the plurality of the heat radiation holes.

The second waterproof member may comprise a second hole corresponding to the camera hole, and the first hole may be formed near the second hole.

The deco-frame may comprise a first part coupled to an inner surface of the rear case; a second part arranged nearer towards the center of the camera hole than the first part, in contact with an inner circumference of the camera hole; and a third portion extended towards the inside of the camera hole from the second part and having a window of the camera coupled thereto.

The heat radiation hole is formed in an area in which the first portion contacts with the second part.

An outer area of the first part in which the heat radiation hole may be formed is projected.

The second waterproof member may comprise a heat conductive material, and the deco-frame may comprise a material having a high heat conductivity.

Advantageous Effects

Accordingly, the embodiments have following advantageous effects. According to the embodiments of the present disclosure, the mobile terminal can improve the heat radiation function and then the durability.

Furthermore, the mobile terminal is capable of utilizing the metal structure as much as possible, without additionally using the space for the heat radiation member, and minimizing the increase of the parts.

Still further, the mobile terminal is capable of radiating the heat by using the metal material located near the electron material and then enhancing the heat radiation efficiency.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF SPECIFIC EMBODIMENTS

Figure 1A:
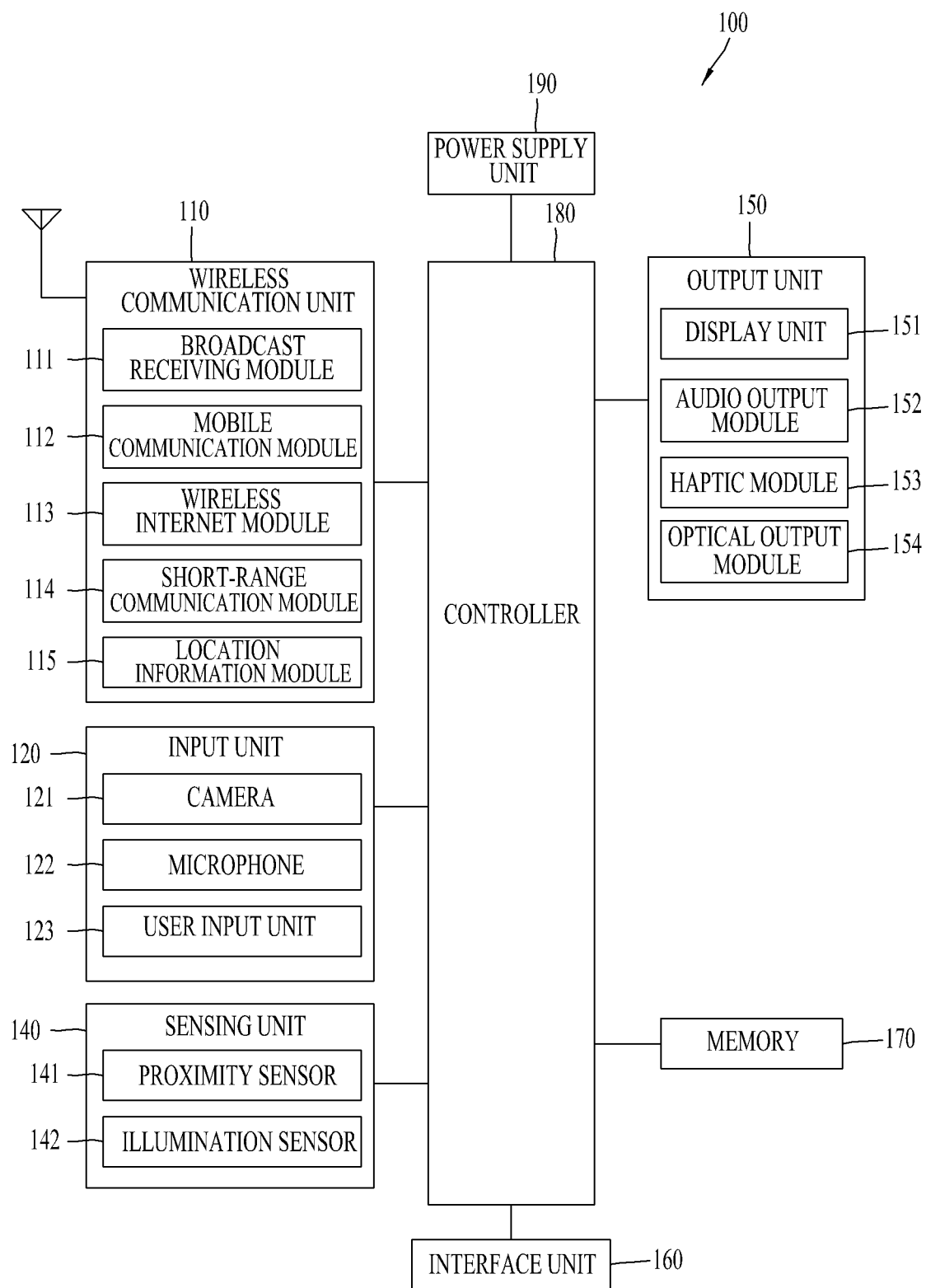
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
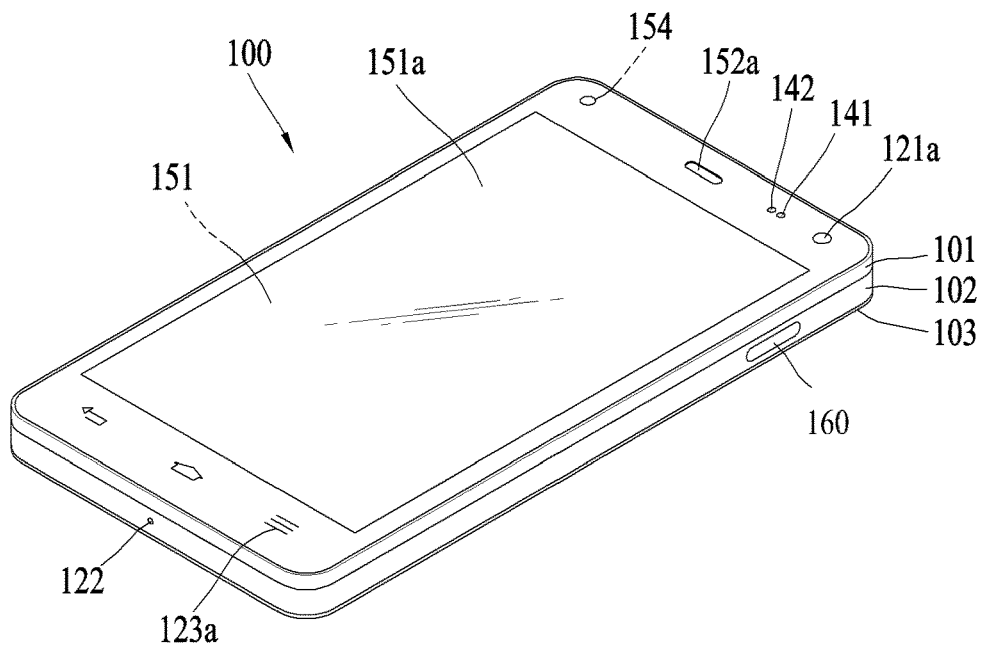
FIGS. 1B and 1C are conceptual views of one example of the mobile terminal, viewed from different directions.
Figure 1C:
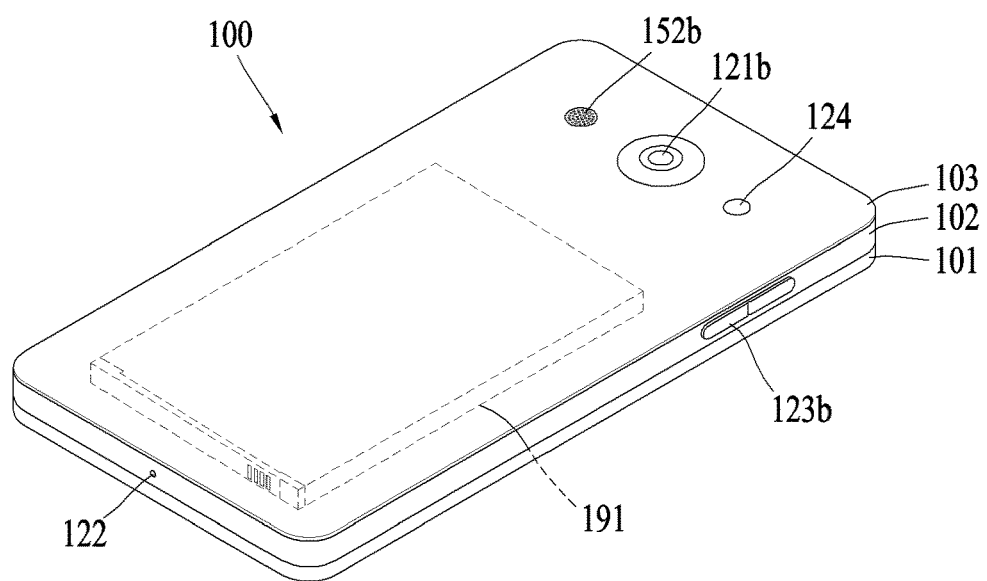

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in The FIG. 1A is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Hereinafter, referring to FIG. 1, the components mentioned above will be described in detail before describing the various embodiments which are realized by the mobile terminal 100 in accordance with the present disclosure.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 may be provided with the power supplied by an external power source and the power supplied therein under the control of the controller 180 so as to supply the needed power to each of the components. The power supply unit 190 may include a battery. The battery may be a built-in type which is rechargeable and detachably loaded in the terminal to be charged.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to refer to the concept of this bore a mobile terminal (100) to at least one of the aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the audio output module, the proximity sensor 141, the illuminance sensor 142, the optical output module 154, the camera 121, the user input unit 123, the microphone 122 and the interface unit 160.

It will be described for the mobile terminal as shown in FIGS. 1B and 1C. The display unit 151, the first audio output module 152a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 152b and the second camera 121b are arranged in rear surface of the terminal body.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate (e.g., a printed circuit board PCB) of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown located adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
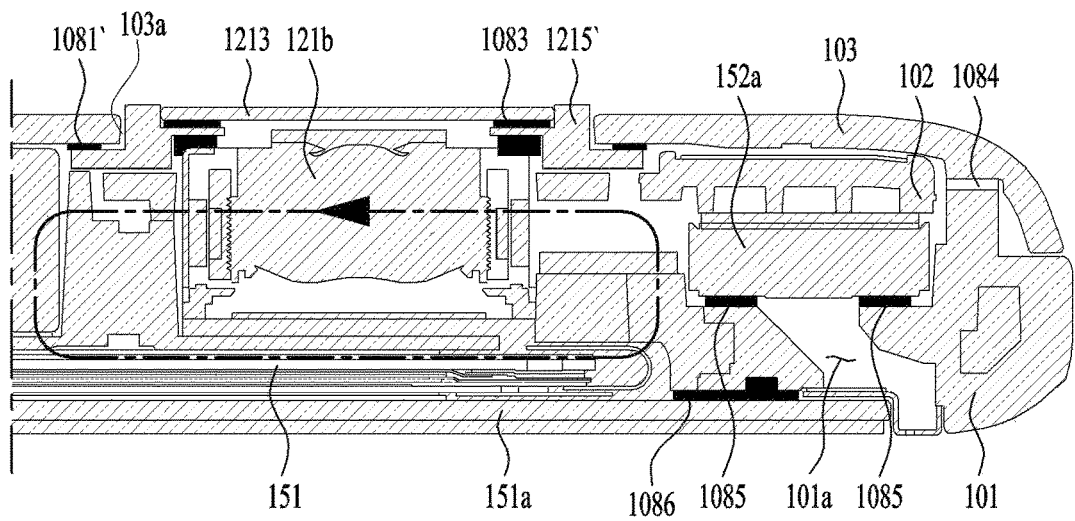
FIG. 2 is a sectional diagram of a conventional mobile terminal.

FIG. 2 is a sectional diagram of a conventional mobile terminal 100. It is necessary to form an opening in the case 101, 102 and 103 in which the interface 160, the button, the microphone 122, the audio output unit 152 and the like are disposed. Waterproof members 1083, 1085 and 1086 are formed around a circumference of the opening and prevent water from flowing into the case 101, 102 and 103. In other words, the waterproof member 1083, 1085 and 1086 may separate an outer area and an inner area from each other to protect the diverse components loaded in the case 101, 102 and 103 from water.

Referring to FIG. 2, there are provided a waterproof member 1081' that is arranged between a circumference of the camera hole 103a and a front surface of the camera module 121b to close the camera hole 103a formed in the case 103 for the camera arrangement and a waterproof member 1085 that is arranged between a circumference of the audio hole 101a formed in the case 101 and the audio output unit 152a to output sound from the audio output unit 101a.

Even when the window 1213 and 151a made of a transparent material that allows light to pass there through is coupled to the case 101 and 103, a waterproof member 1083 and 1086 may be arranged between the window 1213 and 151a and the case 101 and 103.

With that waterproof structure, the opening of the case that may radiate the heat generated in the case might be shut off by the waterproof member. The heat blocked by the waterproof member might be circulated in the case 101, 102 and 103 and then fail to escape from the case 101, 102 and 103 only to raise the temperature inside the case.

Figure 3:
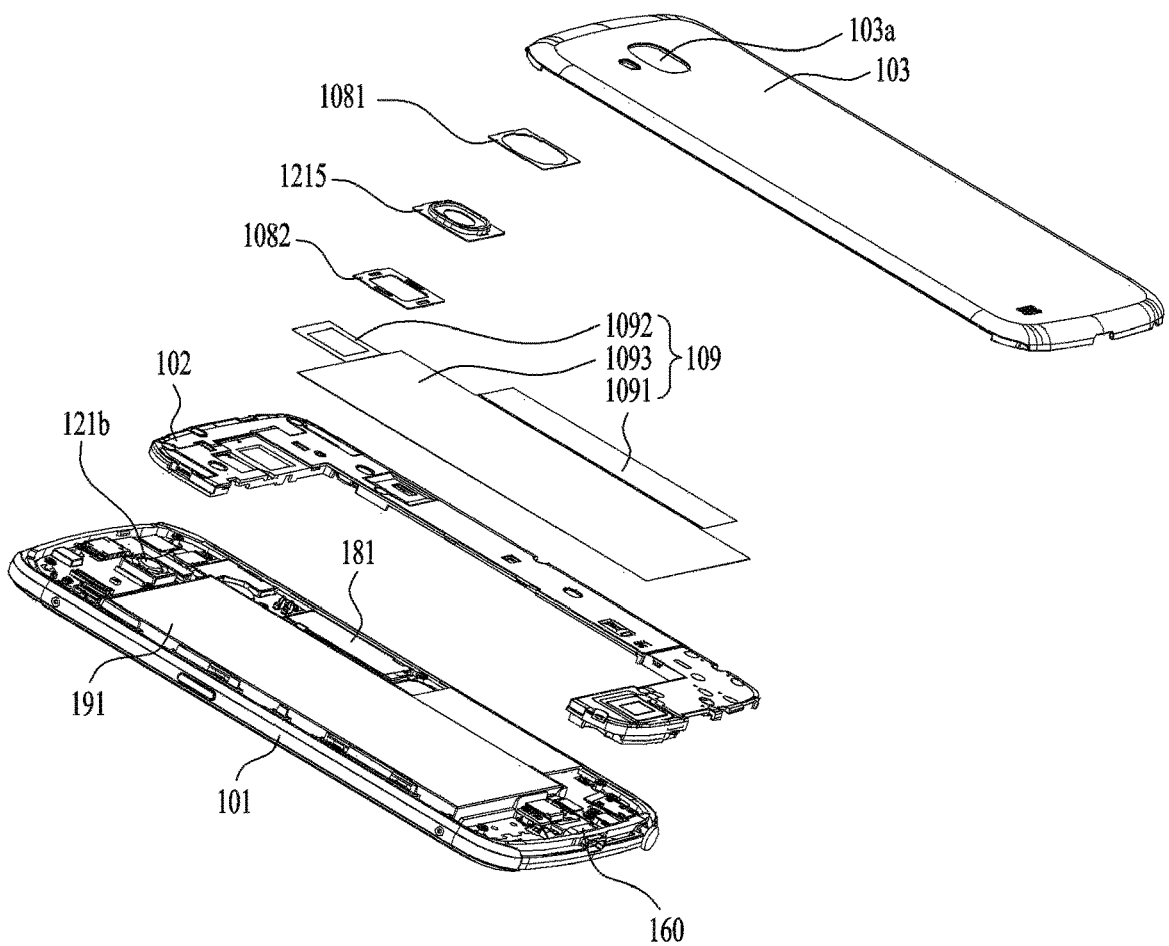
FIG. 3 is an exploded perspective diagram of a mobile terminal in accordance with the present disclosure.

FIG. 3 is an exploded perspective diagram of the mobile terminal 100. FIG. 3 shows a front case 101, a rear case 102, a rear cover 103, a heat radiation sheet 109, a first waterproof member 1081, a second waterproof member 1082 and a deco-frame. The mobile terminal 100 in accordance with the present invention is characterized in that the heat generated therein may be discharged outside, while having a waterproof function to the above-noted disadvantage.

The case in accordance with this embodiment may include the front case 101 arranged in a front area of the mobile terminal 100 to have a display disposed thereon; the rear case 102 arranged behind the front case 101; and the rear case 103 provided to cover a rear surface of the rear case. Diverse components are loaded in a predetermined space defined between the front case 101 and the rear case 101.

The front case 101 may be omitted and the window 151*a* disposed on the front surface may define the front surface of the mobile terminal 100. Alternatively, when the mobile terminal 100 is an integral battery type, the rear case 102 may be omitted and the rear cover 103 may serve as the rear case.

A substrate in which an electronic device 181 (AP: Application Processor) and other diverse electronic components are loaded and a battery 191 may be loaded in the case. In addition to them, the camera 121, the audio output unit 152 and so on may be loaded in the case.

The camera hole 103*a* is formed in the rear cover 103 to collect visual information in the camera module 121*b* arranged towards the rear surface of the mobile terminal 100. A camera window 1213 may be coupled to a front surface of the camera module 121*b* to allow light incident on the camera module 121*b* while protecting it. Also, a deco-frame 1215 may be further coupled to a circumference of the camera hole 103*a* to dispose the camera window 213 and the camera module 121*b* in an precise position corresponding to the camera hole 103*a*.

The camera module 121*b* may include a lens unit for collect the light incident via the camera hole 103*a*; and an image sensor configured to convert the light incident on the lens unit into digital information. The lens unit and the camera hole 103*a* may be arranged on a straight line and the digital information collected in the image sensor of the camera module 121*b* may be transmitted to the substrate to be output on the display unit 151 or stored in a memory.

Some of the electronic components loaded in the mobile terminal 100 that generate heat may be referred to as "heat generation components" and the application process 181 for overall control of the mobile terminal is a typical example of the heat generation components. A heat radiation sheet 109 may be used in radiating the heat generated in the heat generation components such as the application processor 181 more easily.

The heat radiation sheet 109 may have a large area to diffuse the heat generated in the application processor 181 broadly and it may be arranged in an inner surface of the rear case 102. The heat radiation sheet 109 may be made of a preset material having a high heat conductivity (e.g., a copper or graphite sheet).

When heat is diffused by the heat radiation sheet in the mobile terminal 100 without the waterproof structure, the heat may be radiated via the gap formed between the cases 101, 102 and 103 or the hole formed in the cases 101, 102 and 103. However, as the mobile terminal 100 in accordance with the present disclosure has the waterproof structure, the heat might fail to be radiated easily. The embodiments of the present disclosure may radiate the heat generated in the sealed mobile terminal 100 by using the deco-frame 1215.

The heat radiation sheet 109 in accordance with the present disclosure may include a heat absorption portion 1091 configured to absorb the heat from the heat generation components such as the application processor 181; a heat radiation portion 1092 in contact with the deco-frame 1215; and a heat transfer portion 1093 disposed between the heat radiation portion 1092 and the heat absorption portion 1091 to transfer the heat collected from the heat absorption portion 1091 to the heat radiation portion 1092. Some of the heat may get out through the rear cover 103, while penetrating the heat transfer portion 1093. The heat radiation portion 1092 may be arranged in the deco-frame 1215 and radiate the heat via a heat radiation hole 1215*e* formed in the deco-frame 1215.

Figure 4:
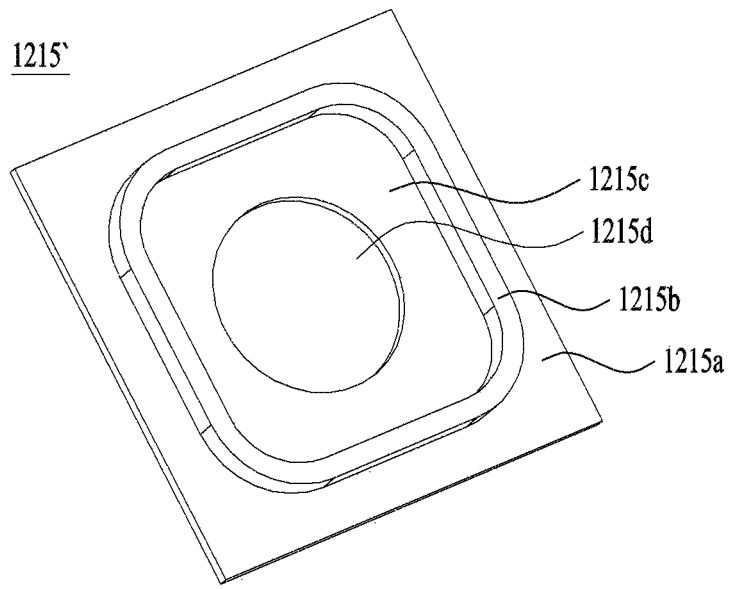
FIG. 4 is a diagram illustrating a deco-frame provided in the mobile terminal.
Figure 4:
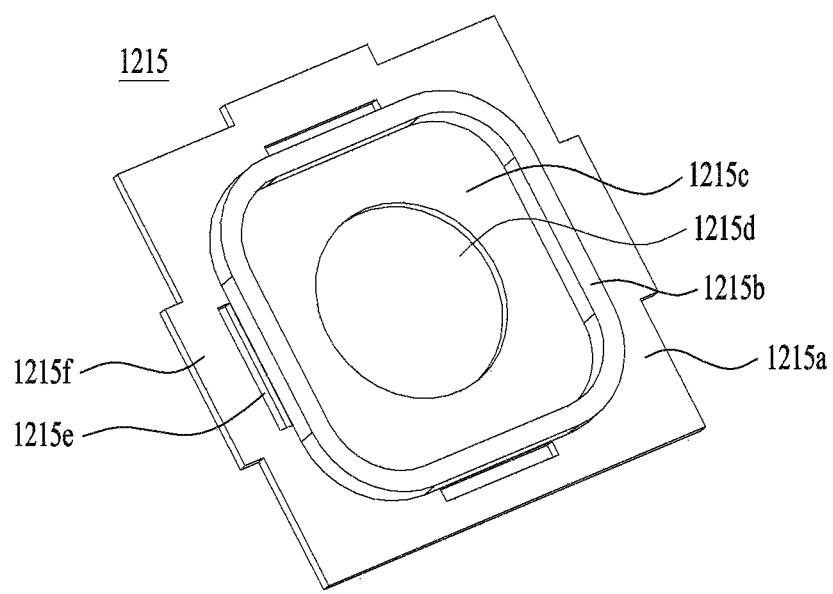

FIG. 4 is a diagram illustrating a conventional deco-frame 1215 and the deco-frame 1215 provided in the mobile terminal 100 in accordance with the present disclosure. (a) illustrates the conventional deco-frame 1215 including a first part 1215*a* configured to contact with an inner surface of the case 103 when the deco-frame 1215 is inserted from the camera hole 103*a*; a second part 1215*b* configured to contact with an inner circumference of the camera hole 103*a*, while located nearer towards the center of the camera hole 103*a* than the first part 1215*a*; and a third part 1215*c* extended from the second part 1215*b* towards the inside of the camera hole 103*a* and having a camera window 1213 configured to cover the lens unit coupled thereto.

The third part 1215*c* has a lens hole 1215*d* corresponding to the lens unit. The third part 1215*c*, the second part 1215*b* and the first part 1215*a* may be arranged towards the outside from the lens hole 1215*d*.

The second part 1215*b* may be in contact with the camera hole 103*a*, having a corresponding shape of the camera hole 103*a*, and projected more outwardly with respect to the case 103 than the first part 1215*a* (that is, towards the rear surface of the mobile terminal 100). The third part 1215*c* may be inserted into the case 103 than the second part 1215*b* so as to receive the camera window. The difference between the heights of the second part 1215*b* and the third part 1215*c* may be corresponding to the thickness of the camera window 1213.

(b) illustrates the deco-frame 1215 in accordance with the present disclosure that may further include a heat radiation hole 1215*e*, compared with the conventional deco-frame 1215 shown in (a). The heat radiation hole 1215*e* may be formed in the first part 1215*a* located in the case 103 not to be exposed outside and a corresponding position to a circumference of the camera hole 103*a*. In other words, as the second part 1215*b* is in contact with the camera hole 103*a*, the heat radiation hole 1215*e* may be formed in contact with the second part 1215*b*. The more radiation holes 1215*e* are provided, the more helpful it may be in heat radiation. Accordingly, a predetermined number of heat radiation holes 1215*e* may be formed in contact with the second part 1215*b*.

The conventional deco-frame 1215 may realize the waterproof structure between the camera hole 103*a* and the case 103 by using only a waterproof member 1081' arranged between the first part 1215*a* and an inner surface of the case 103, with a ring shape. However, the deco-frame 1215 in accordance with the present disclosure may further include the heat radiation hole 1215*e*. Accordingly, the deco-frame may include a first waterproof member arranged between the camera hole 103*a* and itself; and a second waterproof member 1082 configured to make a circumference of the heat radiation hole 1215e be waterproofing, as shown in FIG. 3.

Figure 5:
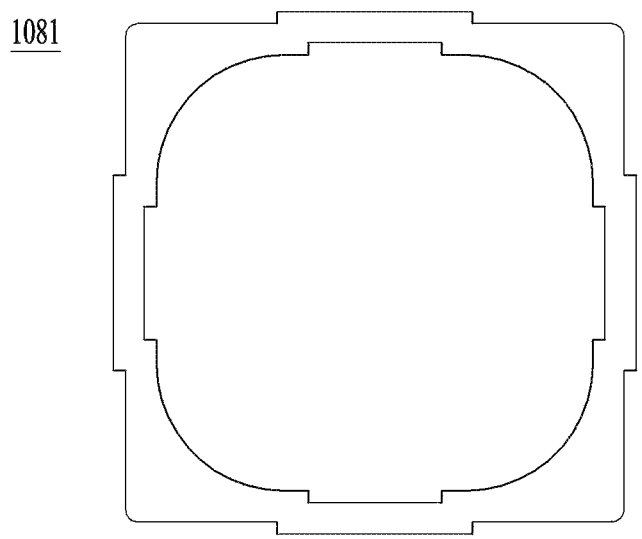
FIG. 5 is a diagram illustrating a first waterproof member and a second waterproof member in accordance with the present disclosure.
Figure 5:
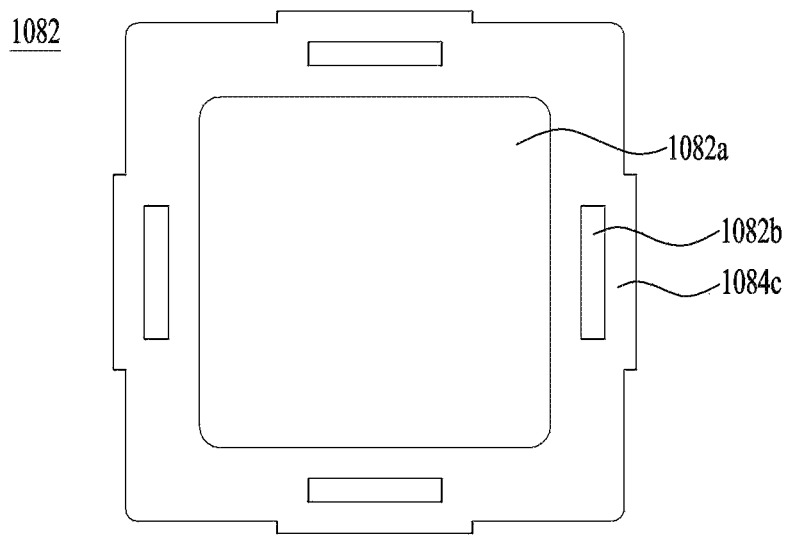

FIG. 5 is a diagram illustrating the first waterproof member 1081 and the second waterproof member 1082. The first waterproof member 1081 shown in FIG. 5 (a) may be formed in a corresponding shape to the first part 1215a and a corresponding area to the heat radiation hole 1215e may be omitted. When the width of the first part 1215a becomes narrow by the heat radiation hole 1215e formed in the first part 1215a, the area in contact with the first waterproof member 1081 may become reduced enough to deteriorate the waterproof reliability.

To secure the waterproof reliability, the area of the first part 1215 in which the heat radiation hole 1215e is formed may be extended wider from the camera hole 103a towards the outside in a direction of a diameter, as shown in FIG. 4 (b). Also, even the first waterproof member 1081 shown in FIG. 5 (a) may be formed in a shape that is bent avoiding the area of the heat radiation hole 1215e, corresponding to the shape of the first part 1215a of the deco-frame 1215.

FIG. 5 (b) illustrates the second waterproof member 1082. The second waterproof member 1082 includes a first hole 1082 formed between the deco-frame 1215 and the heat radiation sheet 109 and corresponding to the waterproof hole to surround the waterproof hole; and a second hole 1082a corresponding to the camera hole 103a to expose the lens unit of the camera module 121b. The first hole 1082a may be located around the second hole 1082b.

Figure 6:
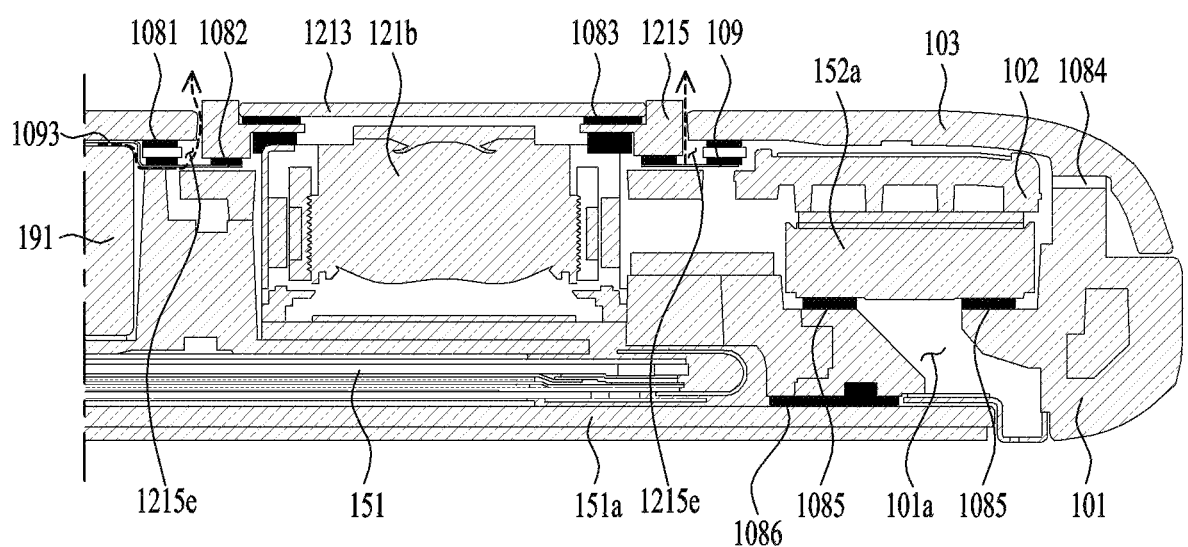
FIG. 6 is a sectional diagram of the mobile terminal in accordance with the present disclosure.

FIG. 6 is a sectional diagram of the mobile terminal 100 and illustrates a multi-layered structure of the camera module 121b, the second waterproof member 1082, the deco-frame 1215 and the first waterproof member 1081.

The heat radiation portion 1092 may be arranged to cover the heat radiation hole 1215e formed in the deco-frame 1215. The second waterproof member 1082 may be located between the deco-frame 1215 and the heat radiation film to make the heat radiation sheet 109 closely contact with the deco-frame 1215.

There is no heat radiation hole 1215e formed in the conventional deco-frame 1215 shown in FIG. 2 such that the second waterproof member 1082 may not be needed. However, the deco-frame 1215 may include the heat radiation hole 1215e such that it may need the second waterproof member 1082 arranged along the circumference of the heat radiation hole 1215e. A corresponding hole to the waterproof hole may be formed in the second waterproof member 1082 and the heat radiation portion 1092 of the heat radiation sheet 109 may be exposed via the waterproof hole and the hole of the second waterproof member 1082. The heat that reaches the heat radiation portion 1092 of the heat radiation sheet 109 as shown in an arrow may penetrate the heat radiation hole 1215e and be radiated via a gap between the camera hole 103a and the deco-frame 1215.

Even if water or moisture drawn between the camera hole 103a and the deco-frame 1215, the first waterproof member 1081, the second waterproof member 1082 and the heat radiation portion 1092 of the heat radiation sheet 109 may not allow the water or moisture to affect the electronic components loaded in the case 103.

When it includes metal, the deco-frame 1215 is capable of absorbing the heat from heat radiation sheet 109 and radiating the heat via the second part 1215b exposed outside the mobile terminal 100. In this instance, the second waterproof member 1082 may include a heat transfer material and transfer the heat to the deco-frame 1215 via the second waterproof member 1082 in a heat conduction method.

In addition, the deco-frame 1215 made of metal may shut off the static electricity drawn into the camera module 121b and prevent the camera module 121b from being damaged by the static electricity.

As described above, the mobile terminal 100 may enhance the heat radiation function and improve the durability of the mobile terminal 100.

Furthermore, the mobile terminal 100 may minimize the increase of the components by utilizing the metal structure as much as possible, without using the space for the heat radiation. Also, the mobile terminal may enhance the heat radiation efficiency by radiating the heat via the metal material arranged in close to the application processor 181.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
   a body comprising a metal frame, a rear case, a space defined between the metal frame and the rear case, and a camera hole formed in the rear case;
   a camera module comprising a lens unit arranged in the space and configured to receive light via the camera hole and an image sensor configured to acquire an image from the light incident on the lens unit;
   a substrate arranged in the space and comprising an application processor;
   a battery loaded in the space and configured to supply an electric power to the application processor;
   a deco-frame comprising a lens hole and a heat radiation hole formed in a circumference of the lens hole and arranged in the camera hole; and
   a heat radiation sheet comprising a heat absorption portion in contact with the application processor, a heat radiation portion provided to cover the deco-frame and a heat transfer portion disposed between the heat absorption portion and the heat radiation portion, wherein the heat radiation portion is exposed to the outside via the heat radiation hole.

2. The mobile terminal of claim 1, further comprising:
   a first waterproof member arranged between the deco-frame and the rear case and comprising a hole corresponding to the camera hole; and
   a second waterproof member arranged between the deco-frame and the heat radiation portion of the heat radiation sheet and comprising a first hole corresponding to the heat radiation hole.

3. The mobile terminal of claim 2, wherein the first waterproof member is located in an outer area of the heat radiation hole.

4. The mobile terminal of claim 2, wherein a plurality of heat radiation holes is provided and the second waterproof member comprises a plurality of ring-shaped waterproof members arranged around the plurality of the heat radiation holes.

5. The mobile terminal of claim 2, wherein the second waterproof member comprises a second hole corresponding to the camera hole, and
   the first hole is formed near the second hole.

6. The mobile terminal of claim 2, wherein the second waterproof member comprises a heat conductive material, and
   the deco-frame comprises a material having a high heat conductivity.

7. The mobile terminal of claim 1, wherein the deco-frame comprises,
   a first part coupled to an inner surface of the rear case;
   a second part arranged nearer towards the center of the camera hole than the first part, in contact with an inner circumference of the camera hole; and
   a third portion extended towards the inside of the camera hole from the second part and having a window of the camera coupled thereto.

8. The mobile terminal of claim 7, wherein the heat radiation hole is formed in an area in which the first portion contacts with the second part.

9. The mobile terminal of claim 8, wherein an outer area of the first part in which the heat radiation hole is formed is projected.

* * * * *